Aug. 15, 1967  MORIYOSHI KUROSAWA  3,335,561
CONTACTLESS BATTERY TIMEPIECE
Filed May 5, 1965  4 Sheets-Sheet 1

INVENTOR.
MORIYOSHI KUROSAWA
BY
Blum, Moscovitz, Friedman, Blum & Kaplan
ATTORNEYS

INVENTOR.
MORIYOSHI KUROSAWA

Aug. 15, 1967 MORIYOSHI KUROSAWA 3,335,561
CONTACTLESS BATTERY TIMEPIECE
Filed May 5, 1965 4 Sheets-Sheet 3

INVENTOR.
MORIYOSHI KUROSAWA
BY
ATTORNEYS

United States Patent Office 3,335,561
Patented Aug. 15, 1967

3,335,561
CONTACTLESS BATTERY TIMEPIECE
Moriyoshi Kurosawa, Tokyo, Japan, assignor to Kabushiki Kaisha Daini Seikosha, Tokyo, Japan
Filed May 5, 1965, Ser. No. 453,345
Claims priority, application Japan, May 18, 1964, 39/39,349
8 Claims. (Cl. 58—23)

ABSTRACT OF THE DISCLOSURE

The present invention provides a contactless electric battery-driven timepiece having a balance wheel and hairspring. A transistor-switching circuit is provided to replace the mechanical contact arrangement of presently used electric timepieces, thereby rendering the timepiece of the present invention greatly resistant against mechanical shock and vibration, and thereby increasing the efficiency of conversion of electric energy provided by the battery to rotative mechanical energy applied to the driving wheel. Furthermore, the aforementioned transistor-switching circuit is rendered substantially independent of temperature variation thereby improving the accuracy and stability of the timepiece of the present invention.

---

The present invention relates to a contactless electric battery driven timepiece having a balance wheel and hairspring. In the past, a battery driven timepiece, particularly a battery wrist watch has required a mechanical contact arrangement, wherein the contacts were closed and opened by reciprocal movement of a balance wheel driven by a driving coil, by means of current flow therethrough provided by the battery. Consequently, over prolonged periods of time, the wear on the mechanical contacts increased contact resistance causing erratic contact operation, and eventually resulting in causing the watch to stop. Furthermore, the electric wristwatches presently used have been insufficiently resistant to mechanical shock and vibration due to the use of metal leaf spring contacts employed to reduce the energy loss in the balance wheel due to the work done in switching the mechanical contacts. Furthermore, in the presently used electric battery-driven wristwatches, adjustment of contacts was difficult since it was necessary to synchronize the closing of the contacts with the period of the balance wheel.

In the present invention by eliminating the use of mechanical-switching contacts entirely, and utilizing transistor-switching instead, the above-mentioned disadvantages inherent in presently utilized battery-driven electric timepieces, are completely avoided.

It is therefore an object of the present invention to provide a contactless electric battery-driven timepiece which is accurate and stable over long period of time, and is highly resistant to shock and vibration.

It is a further object of the present invention to provide a contactless electric battery timepiece having a high efficiency of conversion of electric energy provided by the battery, to rotative mechanical energy applied to the driving wheel.

It is yet a further object of the present invention to provide a transistorized contactless electric battery timepiece which maintains a high degree of accuracy and stability over wide variations in ambient temperature.

It is still a further object of the present invention to provide a contactless electric battery-driven timepiece wherein a high degree of efficiency is achieved by minimizing the magnetic flux leakage in the magnetic circuit of the electric timepiece.

In accordance with the principles of the present invention, there is provided an electric battery-driven timepiece comprising a rotatably spring mounted balance wheel having outer rim of high permeability and a projection of high permeability and extending in a normal direction from the balance wheel outer rim, including a yoke of high permeability and having a shoulder portion and a pair of legs, with one of said legs having an inwardly extending projection, and the other of said legs having an outwardly extending projection disposed beneath said balance wheel outer rim. There is further provided an oscillator circuit comprising a driving coil wound about said yoke legs, and a detector coil wound about said yoke legs in close magnetic coupling relationship with said driving coil. A permanet bar magnet is fixedly secured to and extends outwardly from the end of one of said yoke legs.

In the present invention, in the neutral position of said balance whel, the balance wheel projection is in alignment with said inwardly extending yoke projection to thereby form a magnetic path extending through said other yoke leg, said other yoke leg outwardly extending projection, said balance wheel outer rim, said balance wheel outer rim projection, said inwardly extending yoke leg projection, said permanent magnet and said yoke shoulder portion. The oscillator circuit, of the present invention, is operative to provide periodic pulses to said driving coil to deflect said balance wheel projection from its said neutral position to alternate sides thereof thereby causing said balance wheel to reciprocate at the appropriate frequency.

The features of the present invention which are believed to be novel are set forth with particularity in the appended claims. The invention, itself, however, both as to its organization and method of operation, together with further objects and features thereof may best be understood with reference to the following description taken in conjunction with the accompanying drawings wherein:

Figure 1:
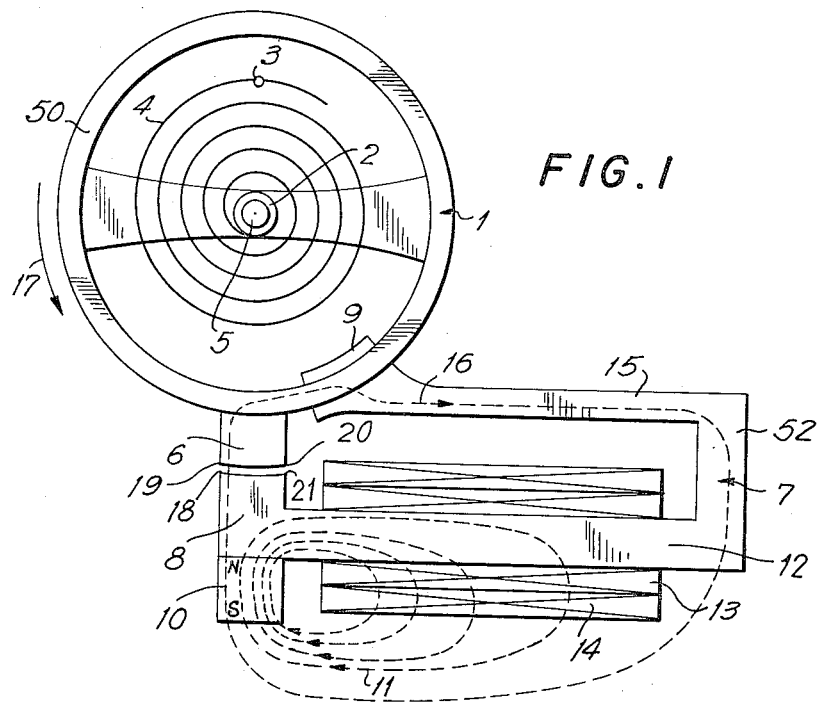
FIG. 1 is a top view of one embodiment of the present invention.

Referring to FIG. 1, one embodiment of the present invention is shown as comprising a balance wheel 1 rotatably mounted on staff 5, and including a hairspring 4 mounted between collet 2 and a stud 3, with balance wheel 1 having a projection 6 extending in a normal direction from the outer rim 50 of balance wheel 1. A yoke 7, which is made out of high permeability iron, is shown to comprise a shoulder portion 52 and a pair of legs 12 and 15. Yoke 7 has an inwardly extending projection 8 extending from the end of leg 12 and an outwardly extending projection 9 extending from the end of leg 15, with projection 9 being disposed beneath outer rim 50, and projection 8 being shown as in alignment with balance wheel projection 6 when balance wheel 1 is in the neutral position as hereinafter explained. A permanent bar magnet 10 is fixedly secured to and extends outwardly from the end of leg 12 and is in substantial alignment with projection 8. Accordingly, as illustrated by flux line 16, there is established a magnetic circuit extending through leg 15, projection 9, outer rim 50, projection 6, projection 8, permanent magnet 10, and shoulder portions 52 of yoke 7. It is to be noted that bar magnet 10 is aligned with its north to south axis in alignment with projection 8 and projection 6 in its neutral position to thereby provide the lines of flux 16 extending through the aforementioned magnetic circuit path, along which path the magnetic resistance is at a minimum, since yoke 7, outer rim 50, and projection 6, are all made out of high permeability iron. The presence of permanent magnet 10 also creates a magnetic circuit extending along the north to south axis of bar magnet 10 and along leg 12 of yoke 7 as indicated by lines of flux 11.

A driving coil 13 is wound about leg 12 of yoke 7, with a detecting coil 14 being wound on top of driving coil 13 in close electromagnetic coupling relationship with driving coil 13.

Figure 2A:
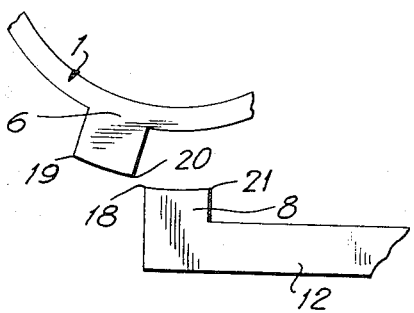
FIGS. 2 (A–C) illustrates the various positions of the balance wheel during the course of operation of the embodiment of FIG. 1.
Figure 2C:
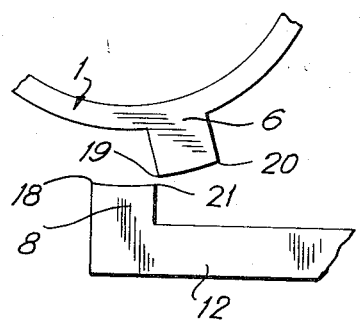
Figure 2B:
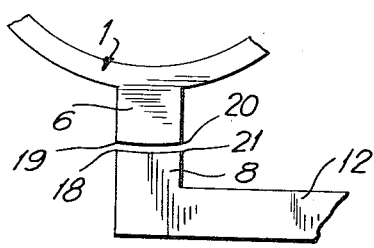

Thus, when balance wheel 1 is in the neutral position, as shown by FIG. 1 and FIG. 2B, balance wheel projection 6 is in substantial alignment with yoke projection 8 to thereby form a closed magnetic loop. When balance wheel projection 6 is displaced to either side of yoke projection 8 the magnetic resistance at the point of displacement rises very sharply, so that when balance wheel 1 is in the position shown in FIG. 2A, or in the position as shown by FIG. 2C, the above-mentioned magnetic loop which includes balance wheel projection 6 is substantially in an opened condition. Accordingly, when balance wheel projection 6 is either in the position shown in FIG. 2A or in the position shown in FIG. 2C, i.e., displaced condition, magnetic path 16 is substantially interrupted and consequently the greater part of the lines of flux emanating from permanent magnet 10 intercept the windings of detecting coil 14. However, when balance wheel projection 6 is in the aligned, i.e., neutral position as shown by FIG. 1 and FIG. 2B, there is established a magnetic path of low magnetic resistance as indicated by magnetic flux lines 16, and accordingly a greater portion of the flux lines emanating from permanent magnet 10 flows through magnetic path 16, thereby reducing the number of flux lines intersecting detecting coil 14.

Figure 3A:
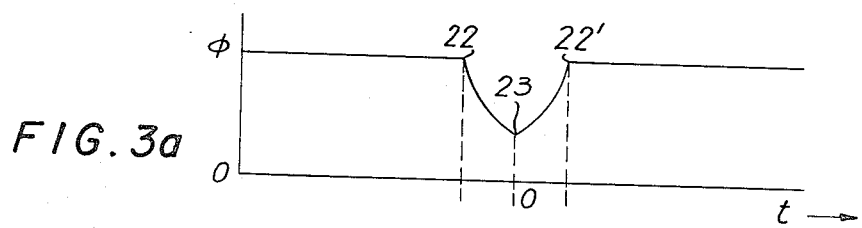
FIGS. 3 (A–C) shows the various waveforms produced in the embodiment of FIG. 1.

The above variation in magnetic flux line concentration between magnetic paths 16 and 11 is shown graphically by the waveform diagrams of FIG. 3 taken in conjunction with the various positions of balance wheel projection 6 illustrated in FIG. 2.

Referring to FIG. 2A, when corner 20 of projection 6 approaches corner 18 of projection 8 in the counterclockwise direction as shown by arrow 17, the magnetic resistance of magnetic path 16 is sharply reduced, causing a corresponding sharp increase in the number of flux lines in magnetic path 16, the flux line concentration thereafter gradually increasing until it reaches a maximum when projection 6 is in the aligned, i.e., neutral position, as shown by FIG. 2B. As balance wheel projection 6 continues in the counterclockwise direction past its neutral position toward its displaced position shown in FIG. 2C, the magnetic flux density in magnetic path 16 is correspondingly abruptly decreased. This variation in flux density with time, i.e., balance position of balance wheel projection 6, is shown by the substantially triangular curve in FIG. 3A where the slope of the curve between points 22 and 23, and between points 23 and 22', is very steep, with point 22 corresponding to the balance wheel position shown in FIG. 2A, point 23 to the balance wheel position shown in FIG. 2B, and point 22' to the balance wheel position shown in FIG. 2C.

Figure 4:
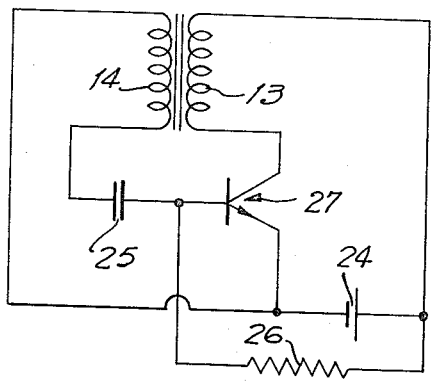
FIG. 4 is a schematic diagram of the oscillator circuit employed in the embodiment of FIG. 1.

Referring to FIG. 4 the oscillator circuit for providing electromagnetic impulses to balance wheel 1 is shown to comprise a transistor 27 having its emitter connected to the negative terminal of battery source 24, and its base terminal is connected to the positive terminal of battery source 24 through bias resistor 26. Driving coil 13 in the output circuit of transistor 27 is connected between the collector of transistor 27 and the positive terminal of battery source 24. Detecting coil 14 in transformer relationship with driving coil 13 is connected at one end to the emitter of transistor 27 and at the other end through blocking capacitor 25 to the input base terminal of transistor 27.

Figure 3B:
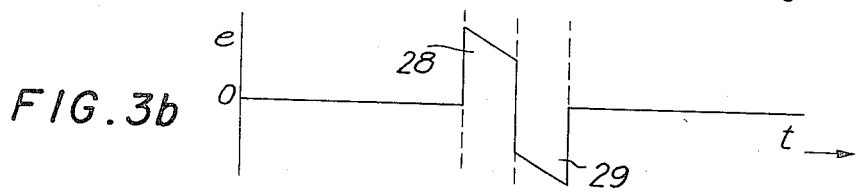
Figure 3C:
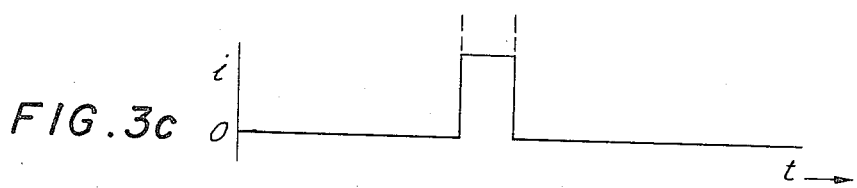

The variation in the flux density intercepting the windings of detecting coil 14 in magnetic path 11 causes a voltage to be generated across detecting coil 14 which is proportional to the flux variation. This detected voltage is applied by coil 14 across the base to emitter terminals of transistor 27 operating in the Class B mode, i.e., current flowing for approximately a half cycle, as shown by FIG. 3C. Thus, as shown by FIG. 3B and FIG. 3C, base current will flow in the positive half cycle, i.e., portion 28 of FIG. 3B, driving transistor 27 into conduction and causing an amplified current to flow in driving coil 13. As seen from FIG. 5, since output driving coil 13 and detecting coil 14 are in transformer relation, the output of transistor 27 at the collector terminal will be fed back to the input base terminal through the transformer action of coils 13 and 14. Since coils 13 and 14 are wound about each other in close magnetic coupling relationship, the amplification gain of transistor 27 approaches infinity because of the positive feedback action, causing transistor 27 to saturate and generating a rectangular driving current in driving coil 13 as shown by FIG. 3C. Now the detected voltage is zero when the balance wheel is in the neutral position, and hence the driving force will also be zero, with the detected voltage being negative when projection 6 is in the neutral position and the driving force still remaining zero for the negative portion 29 in the waveform of FIG. 3B corresponding to the period when transistor 27 is reversed biased and in the cut-off position. Accordingly, balance wheel 1 receives a driving impulse when projection 6 is located just before its neutral position, with the driving impulse being applied in either the clockwise or counterclockwise direction in the reciprocal movement of balance wheel 1.

Figure 5:
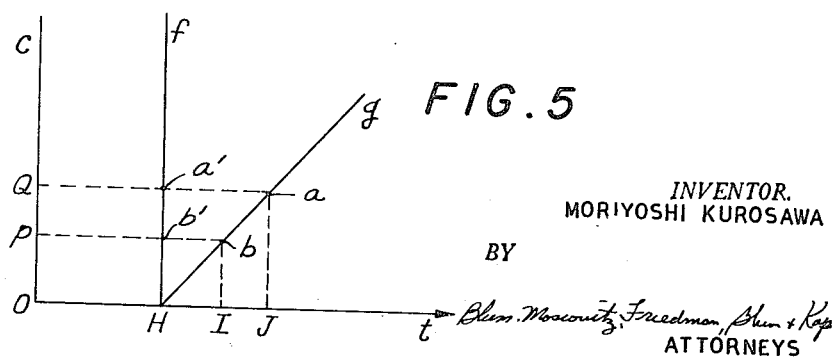
FIG. 5 is a graph showing the variation in the cut-off point of the base voltage with respect to temperature for the transistor shown in the oscillator circuit of FIG. 4.

It will be understood that since the oscillator circuit of FIG. 4 utilizes a transistor 27 which is sensitive to ambient temperature, the cut-off point for transistor 27 will vary with ambient temperature as well as being the function of the rate of change of voltage with respect to time of the detected pulse applied to the base to emitter terminals of transistor 27 by detecting coil 14. FIG. 5 illustrates graphically the variation of the cut-off point of transistor 27 as a function of the slope of the detected voltage pulse and the ambient temperature. Thus, curve G represents a detected voltage pulse of a relatively long rise time and curve F shows the leading edge of a detected pulse having very fast rise time. It is seen that for a low ambient temperature indicated by point $a$ the cut-off time in the cycle will be at point J whereas for a high ambient temperature indicated by $b$ the cut-off time is indicated by point I. However, for a detected pulse having a very sharp rise time as shown by curve F, the cut-off time for a low ambient temperature indicated by point $a'$ will be substantially the same as the cut-off time for a high temperature indicated by point $b'$, the cut-off time for both high and low temperatures for the fast rise time detected pulse F, both being constant at H. It is noted that the variation in the cut-off point for transistor 27 relates to the energizing position of balance wheel 1, with the point at which projection 6 begins to drive balance wheel 1 depending on ambient temperature.

In addition to rendering the cut-off point of transistor 27 substantially independent of changes in ambient temperature, the very short rise time of the leading edge of the detected voltage pulse serves to reduce the amount of current drain in the oscillator circuit, a consideration which is very important in view of the small size of the battery in a wristwatch. To this aim, driving coil 13 is wound very closely to leg 12 of yoke 7 and detecting coil 14 has a large number of turns and is wound closely to coil 13.

Another factor which serves to reduce the rise time of the detected voltage pulse, is the fact that the flux change is very abrupt as balance wheel projection 6 approaches projection 8 as shown in FIG. 2A. Furthermore, since both driving coils 13 and detecting coil 14 are closely wound with a large number of turns, the positive feedback gain is high resulting in the detected pulse having a very sharp leading edge, i.e., a very short rise time, thereby insuring stable timing for balance wheel 1. It will be noted in connection with the above, that in view of the large number of turns on driving coil 13 and detecting coil 14 permanent magnet 10 may be small in size without requiring highly accurate dimensions, and in view of the positive feedback in the oscillator circuit of FIG. 4, transistor 27 may suitably be a relatively inexpensive transistor having a relatively low gain.

Figure 6:
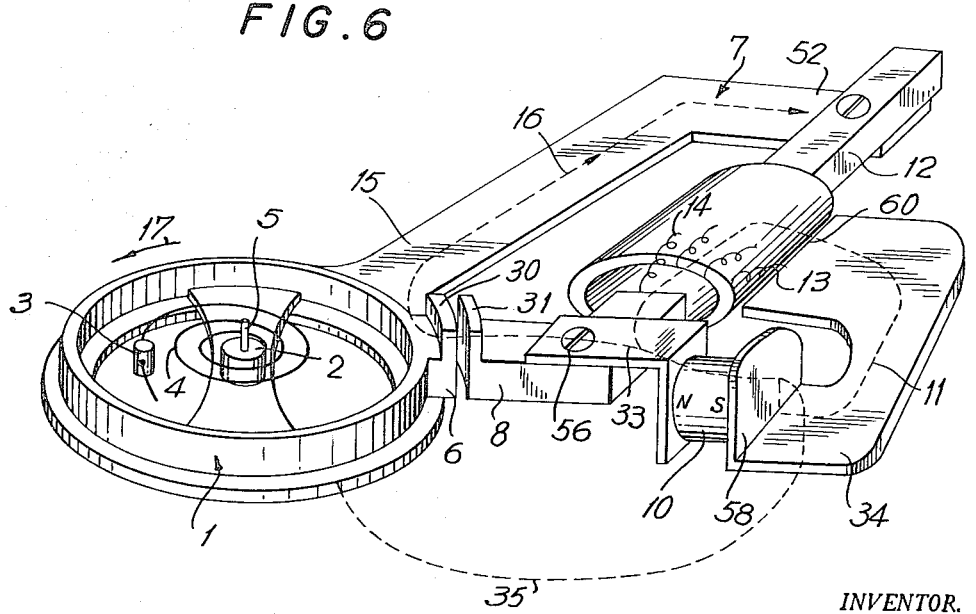
FIG. 6 is a perspective plan view of a second embodiment of the present invention.

Referring to FIG. 6, there is shown a second embodiment of the present invention which is similar in its basic arrangement and principles of operation, to the above-described embodiment of FIG. 1, but includes some features to reduce the magnetic flux leakage at various points in the magnetic circuits that are established during the course of operation of the timepiece of the present invention. Accordingly, those elements of the embodiment of FIG. 6 which are similar to the corresponding elements in the embodiment of FIG. 1, have been given the same identification numbers as those in FIG. 1, in order to facilitate a clear understanding of the operation of the embodiment of FIG. 6. As shown in FIG. 6, yoke projection 8 has an upright wall 31 extending therefrom, and balance wheel projection 6 also has a similarly shaped upright wall 30 extending therefrom such that when balance wheel projection 6 is in its neutral position, as explained hereinabove, upright walls 30 and 31 are in face-to-face spatial relation. There is further provided in the embodiment of FIG. 6, a subsidiary L-shaped yoke piece 33 which is fixedly secured to yoke leg 12 by means of screw 56. Permanent magnet 10, in this embodiment, is cylindrically shaped and is fixedly secured at one of its ends to the other end of subsidiary yoke piece 33. There is further provided, a C-shaped subsidiary yoke piece 34 in the form of a relatively thin plate, having one of its ends in the form of a upright wall 58 fixedly secured to the other end of permanent magnet 10, with the other end 60 of subsidiary yoke plate 34 being approximately disposed to outer wound detecting coil 14.

From the above it will be appreciated that flux leakage between yoke projection 8 and balance wheel projection 6 is substantially minimized because of the relatively large interface areas of walls 30 and 31 respectively as well as the very narrow gap between walls 30 and 31. Furthermore, the magnetic path 11, rather than extending through free air as in the embodiment of FIG. 1, now passes through the very low reluctance path of subsidiary yoke plate 34 thereby further minimizing the flux leakage in magnetic path 11, while insuring that a maximum number of flux lines emanating from permanent magnet 10 intersect the windings of detecting coil 14. Furthermore, the leakage flux path from permanent magnet 10 to the outer rim 50 of balance wheel 1, as indicated by line 35, is virtually eliminated by virtue of the fact that yoke plate 34 is fixedly secured to permanent magnet 10 at one of its poles. It is understood that yoke piece 33, yoke plate 34, as well as upright walls 30 and 31 are made out of high permeability iron as is the remaining portions of yoke 7.

Figure 7:
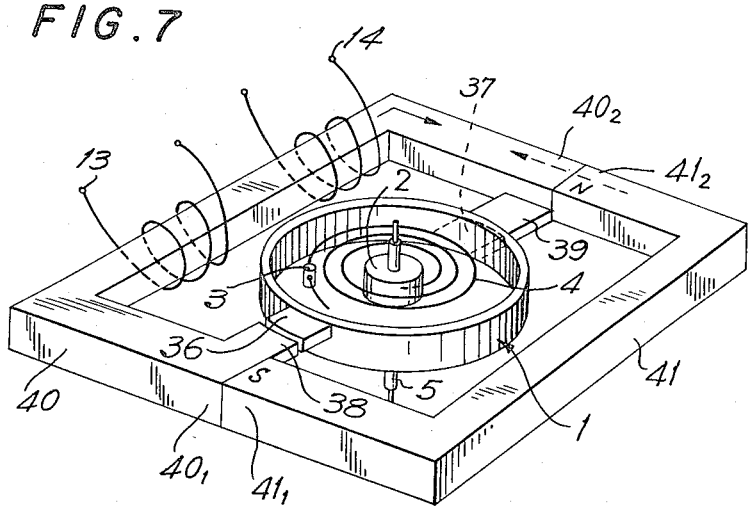
FIG. 7 is a perspective plan view of a third embodiment of the present invention.

In FIG. 7 showing the 3rd embodiment of the invention, balance wheel 1 of high permeability material is shown to have two projections 36 and 37, one of which is situated in upper part of balance wheel 1, the other in opposite below part of it. Fixed projections 38 and 39 are adjacent and vis-a-vis to both wheel projections 36 and 37, both being fixed at extremities $40_1$ and $40_2$ of yoke iron 40 made of high permeability material. Extremities $41_1$ and $41_2$ of permanent magnet 41 are attached to extremities $40_1$ and $40_2$ of yoke iron 40, with permanent magnet 41 being magnetized in the direction N S as shown in FIG. 7 whereby magnetic flux flows in the direction indicated by dotted arrow in the figure. Balance wheel 1 has a hairspring 4 suspended between collet 2 and stud 3 and is capable of reciprocal movement around staff 5.

Figure 9:
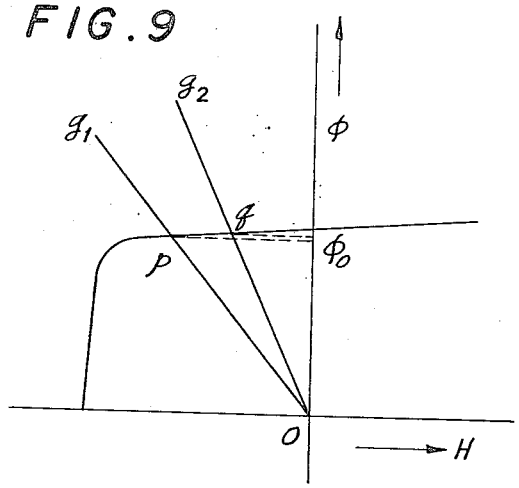
FIG. 9 shows the demagnetization curve of the permanent magnet utilized in the embodiments of FIGS. 1, 6 and 7.

In the neutral position of balance wheel 1, as shown in FIG. 7, the greater portion of magnetic flux $\phi_0$ generated from permanent magnet 41 passes through yoke iron 40, but a part thereof flows from fixed projection 39 through projection 37 of wheel 1 to wheel 1. The demagnetizing curve for permanent magnet 41 is shown by the solid line in FIG. 9, and is similar to the rectangular hysteresis loop characteristic the magnetic resistance of yoke 40 is relatively low, the operation curve being represented by solid line $g_1$. If the magnetic circuit is limited only to magnet 41 and yoke iron 40, the intersecting point P will be the operating point. In the case when the positional relation between projections 36, 37 and 38, 39 is that shown in FIG. 7, the magnetic path through balance wheel 1 between fixed projections 38, 39 forms day magnetic bypass, where the gaps between projections 36, 37 and 38, 39 are very narrow, so that the magnetic resistance is small. The total magnetic resistance comprising to permanent magnet 41 becomes smaller when completed by the parallel arrangement of yoke 40 and by-pass 38, 40, and therefore the operation curve shown by straight $g_2$ in FIG. 9 and the operation point is displaced to point $q$. However magnetic flux $\phi_0$ of permanent magnet 41 is deemed to be a constant value because points P and $q$ exist on the flat part of the demagnetizing curve.

Furthermore, if R1 represents the magnetic resistance of yoke iron 40, R2 is the resistance of the bypass from fixed projection 39 to projection 40 through projection 37, wheel 1 and projection 36 of the wheel; $\phi_1$ represents the magnetic flux in yoke iron 40, and $\phi_2$ represents the magnetic flux in balance wheel 1, then we have $$\phi 1 : \phi 2 = R2 : R1$$

where $$\phi_0 = \phi 1 + \phi 2$$

Therefore $$\phi 1 = \frac{R2}{R1+R2} \times \phi_0$$

and $$\phi 2 = \frac{R1}{R1+R2} \times \phi_0$$

Figure 8A:
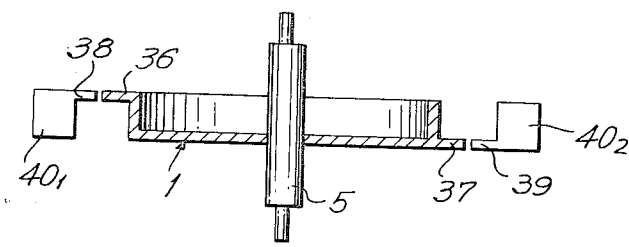
FIGS. 8 (A–B) is a sectional view of the balance wheel and yoke of the embodiment shown in FIG. 7.
Figure 8B:
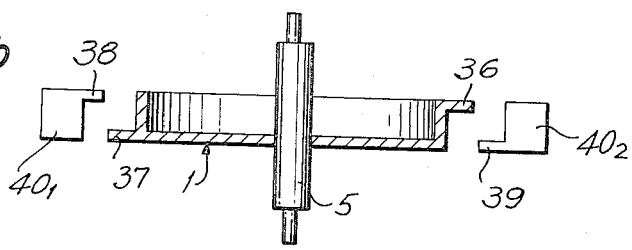

When projections 36 and 37 of wheel 1 are face to face with fixed projections 38 and 39, to form a magnetic by-pass, magnetic flux $\phi_0$ passing through yoke iron 40 is reduced to $$\frac{R2}{R1+R2} \times \phi_0$$

with the difference in flux being shunted into the above mentioned bypass. Due to the variation of magnetic flux in yoke iron 40, an induction voltage is generated in detecting coil 14, which is wound on yoke iron 40. The relative position of projection 36 to projection 38, and projection 37 to projection 39 is alternated as shown in FIG. 7 and FIG. 8, so that the aforementioned magnetic bypass is intersected between projections 36 and 38 and between projections 37 and 39, when balance wheel 1 rotates 180° from its position as shown in FIG. 7 and FIG. 8(A) to its position as shown of FIG. 8(B). Accordingly, shunting of magnetic flux in the last mentioned operation, it is avoided due to the high magnetic resistance produced by the large air-gap. Consequently, stable and accurate oscillation is achieved, by the timepiece of FIG. 7.

An important feature of the present invention resides in the fact that the permanent magnet is concerned only with detection and is not involved in the driving operation. A high driving efficiency is thereby obtained, since permanent magnet has low permeability and high magnetic resistance and most of magnetic flux generated from driving coil 13 flows in the magnetic path comprising iron 40, fixed projections 39, wheel projection 37, balance wheel 1, wheel projection 36, fixed wheel 38, and iron yoke 40.

Fixed projections 39 and 38 attract movable balance wheel projections 37 and 36 respectively by electro-magnetic motive force, to thereby drive balance wheel 1 for in reciprocal movement. This reciprocal motion is independent of the direction of movement of balance wheel 1, i.e. the rotational movement in the right and left directions are entirely symmetrical and accordingly, vibrations tend to balance out, thereby providing stabilized reciprocating rotative motion of balance wheel 1.

As described above in the preferred embodiment of the present invention, there is avoided usual faults such as difficulty of adjustment of mechanical contacts, and rate variation or stoppage occurring in conventional electric timepieces due to faulty contacts. The present invention, in the preferred embodiments thereof achieves many advantages, such as fidelity, anti-shock and anti-vibration ability, durability, stability, while improving, at the same time, the temperature characteristic of the transistor oscillator circuit and rendering it independent of variations in gain of interchanged transistors.

Furthermore, in accordance with the principles of the present invention, due to the high conversion efficiency from electric energy to mechanical energy, extremely small electric power, for example $7\mu\omega$ is available for a powering and electric wrist watch.

While there has been shown particular embodiments of the present invention, it will be understood that it is not wished to be limited thereto since modifications can be made both in the structural and circuit arrangements and it is contemplated in the appended claims to cover any such modifications as fall within the true spirit and scope of the invention.

What is claimed:

1. An electric battery-driven timepiece comprising:
 a rotatably spring-mounted balance wheel having an outer rim of high permeability iron and a projection of high permeability iron extending in a normal direction from said balance wheel outer rim, a yoke of high permeability iron having a shoulder portion and a pair of legs, one of said legs having an inwardly extending projection, and the other of said legs having an outwardly extending projection disposed beneath said balance wheel outer rim, an oscillator circuit comprising a driving coil wound about said first yoke leg and a detector coil wound about said driving coil in close magnetic coupling relationship with said driving coil, a permanent bar magnet fixedly secured to and extending outwardly from the end of one of said yoke legs, whereby in the neutral position of said balance wheel, said balance wheel projection is in alignment with said inwardly extending yoke projection to form a first low reluctance magnetic circuit path, said oscillator circuit being operative to provide periodic pulses to said driving coil to alternately deflect said balance wheel projection from its said neutral position out of alignment with said inwardly extending yoke projection to a first offset position to one side of said neutral position, and a second offset position to the other side of said neutral position, whereby in said first and second offset positions of said balance wheel, there is formed a second low reluctance magnetic path.

2. An electric battery-driven timepiece, as defined in claim 1 wherein said first low reluctance magnetic circuit path comprises said other yoke leg, said other yoke leg outwardly extending projection, said balance wheel outer rim, said balance wheel outer rim projection, said inwardly extending yoke leg projection, said permanent magnet and said yoke shoulder portion.

3. An electric battery-driven timepiece as defined in claim 2, wherein said second low reluctance magnetic path comprises said first yoke leg and said permanent bar magnet.

4. An electric battery-driven timepiece comprising:
 a rotatably spring-mounted balance wheel having an outer rim of high permeability iron and a projection of high permeability iron extending in a normal direction from said balance wheel outer rim, said rim projection including a wall extending upwardly from the free end thereof, a yoke of high permeability iron having a shoulder portion and a pair of legs, one of said legs having an inwardly extending projection including a wall extending upwardly from the free end thereof in face-to-face relation with said rim projection wall across an air gap therebetween, the other of said legs having an outwardly extending projection disposed beneath said balance wheel outer rim, an oscillator circuit comprising a driving coil wound about said first yoke leg and a detector coil wound about said driving coil in close magnetic coupling relationship with said driving coil, a permanent bar magnet fixedly secured to and extending outwardly from the end of one of said yoke legs, whereby in the neutral position of said balance wheel, said balance wheel projection is in alignment with said inwardly extending yoke projection to form a first low reluctance magnetic circuit path, said oscillator circuit being operative to provide periodic pulses to said driving coil to alternately deflect said balance wheel projection from its said neutral position out of alignment with said inwardly extending yoke projection wall to a first offset position to one side of said neutral position, and a second offset position to the other side of said neutral position, whereby in said first and second offset positions of said balance wheel there is formed a second low reluctance magnetic path.

5. An electric battery-driven timepiece as defined in claim 4, including a subsidiary L-shaped yoke piece fixedly secured at one of its ends to said one yoke leg, said permanent bar magnet being fixedly secured at one of its ends to the other end of said L-shaped yoke piece, and a subsidiary C-shaped plate yoke piece having an upright wall extending from one of its ends, said permanent bar magnet having its other end fixedly secured to said last mentioned yoke piece wall, whereby in said balance wheel neutral position said first low reluctance magnetic circuit path comprises said other yoke leg, said other yoke leg outwardly extending projection, said balance wheel outer rim, said balance wheel outer rim projection, said wall extending from said balance wheel projection, said air gap, said wall extending from said inwardly extending leg projection, said L-shaped yoke piece, said C-shaped plate yoke piece, said one yoke leg, and said yoke shoulder portion.

6. An electric battery-driven timepiece as defined in claim 5 wherein in said first and second offset positions of said balance wheel, said second low reluctance magnetic path comprises said one yoke leg, said L-shaped yoke piece, said permanent magnet, and said C-shaped plate yoke piece.

7. An electric battery-driven time piece as defined in claim 6 wherein said permanent magnet is cylindrically shaped.

8. An electric battery-driven time piece as defined in claim 1 wherein said oscillator circuit comprises a battery having poistive and negative terminals, a transistor having its emitter connected to said negative terminal, said driving coil being connected between the collector of said transistor and said positive battery terminal, a bias resistor connected between the base of said transistor and said battery positive terminal, a blocking capacitor connected at one end to said base, and a detecting coil connected between the other end of said blocking capacitor and said negative battery terminal, said driving coil and said detecting coil being in transformer relation.

References Cited
FOREIGN PATENTS
1,177,277   4/1959   France.

RICHARD B. WILKINSON, *Primary Examiner.*
G. F. BAKER, M. LORCH, *Assistant Examiners.*